United States Patent [19]
Van Steenkiste et al.

[11] Patent Number: 5,225,104
[45] Date of Patent: Jul. 6, 1993

[54] POLYMER DISPERSED LIQUID CRYSTAL FILMS HAVING IMPROVED OPTICAL PERFORMANCE

[75] Inventors: Thomas H. Van Steenkiste, Washington; Nuno A. Vaz, West Bloomfield; George P. Montgomery, Jr., Troy; George W. Smith, Birmingham, all of Mich.

[73] Assignee: General Motors Corporation, Detroit, Mich.

[21] Appl. No.: 668,010

[22] Filed: Mar. 12, 1991

[51] Int. Cl.[5] .................. C09K 19/52; C09K 19/00; G02F 1/13; B05D 3/06
[52] U.S. Cl. ..................... 252/299.01; 252/299.5; 252/582; 428/1; 359/52; 427/213; 427/508
[58] Field of Search .......... 252/299.01, 299.5; 359/52; 428/1; 427/44, 54.1, 213.3

[56] References Cited

U.S. PATENT DOCUMENTS

| | | | |
|---|---|---|---|
| 4,728,547 | 3/1988 | Vaz et al. | 428/1 |
| 4,888,126 | 12/1989 | Mullen et al. | 252/299.5 |
| 4,938,568 | 7/1990 | Margerum et al. | 359/48 |
| 4,971,719 | 11/1990 | Vaz et al. | 252/299.5 |
| 5,021,188 | 6/1991 | Vaz et al. | 252/299.5 |
| 5,099,343 | 3/1992 | Margerum et al. | 359/48 |

OTHER PUBLICATIONS

G. P. Montgomery, Jr., "Polymer-dispersed liquid crystal films for light control applications", Proc. SPIE 1080, p. 242 (1989).

G. W. Smith et al., "The relationship between formation kinetics and microdroplet size of epoxy-based polymer-dispersed liquid crystals", Liq. Cryst. 3, 543 (1988).

Primary Examiner—Robert L. Stoll
Assistant Examiner—Shean C. Wu
Attorney, Agent, or Firm—George A. Grove; Domenica N. S. Hartman

[57] ABSTRACT

A film of a polymer dispersed liquid crystal material having improved light scattering and solar attenuation properties, which utilizes a significantly reduced amount of the liquid crystal component as compared to conventional polymer dispersed liquid crystal films, is provided. These improved properties are obtained by the addition of preferably up to about three volume percent of an organic photoaccelerator chosen from the group of amines or aminobenzoates, to the liquid crystal-polymer precursor mixture prior to curing of the mixture.

19 Claims, 1 Drawing Sheet

POLYMER DISPERSED LIQUID CRYSTAL FILMS HAVING IMPROVED OPTICAL PERFORMANCE

The present invention generally relates to thin films of polymer dispersed liquid crystal materials incorporating birefringent nematic liquid crystal materials. More specifically, this invention relates to optically responsive films of these materials that contain a small amount of an organic photoaccelerator component. Even more specifically, these films contain a significantly reduced amount of the liquid crystal component, yet are characterized by significantly enhanced light scattering and solar radiation attenuation properties, as compared to conventional polymer dispersed liquid crystal films.

BACKGROUND OF THE INVENTION

Polymer dispersed liquid crystal (PDLC) films, consisting of liquid crystal microdroplets dispersed in a polymer matrix, are potentially useful for solar energy control and other electro-optic applications, such as sunroofs, solar windows and information displays. Generally, these materials are formed by the incorporation of liquid crystals in a cross-linked epoxy binder, or in a polymer matrix which has been cured using thermal, ultraviolet or electron-beam methods. These films can easily be switched from an off-state which is cloudy, opaque, and light scattering, to an on-state which is essentially transparent. Most often this switching is accomplished by application of a suitable electrical voltage across the thickness of the film. However other methods for accomplishing this change in transparency of the film include the application of heat or stress, or alternatively the application of a magnetic field across the thickness of that portion of the film where transparency is desired.

The usefulness of a particular polymer dispersed liquid crystal film depends on both the magnitude of light scattering by the film and the directions into which the light is scattered. For windows, sunroofs and other devices which are formed from these polymer dispersed liquid crystal films and which are designed to control the transmission of solar radiation, including heat and light, it is necessary to maximize the amount of radiation backscattered from the film so as to minimize the amount of heat and light transmitted through the film during its off or scattering state when no electrical potential is applied.

Optimizing the solar heat load attenuation and light scattering performance of a polymer dispersed liquid crystal film for a specific application requires control over the various film parameters. These parameters include not only the refractive indices of the liquid crystal and polymer matrix materials, but also the concentration and size distribution of the liquid crystal droplets in the film, and further the fraction of the initial liquid crystal displaced into the droplets by polymerization of the polymer precursor. Most of these critical film parameters are established during the cure of the polymer. These parameters depend on the cure conditions which influence the cure kinetics (i.e., temperature and radiation intensity), as well as on the exact chemical composition of the polymer precursor including any additives.

Much work has been done in this field to optimize the light scattering and solar heat load attenuation characteristics of these polymer dispersed liquid crystal films so as to produce films which are capable of reducing solar heat and light transmission for such applications as automotive sunroofs and windows as well as building windows and structures. However, the research has failed to optimize those cure conditions which will result in the desired film qualities. To date, current state of the art polymer dispersed liquid crystal films have been characterized by solar attenuation properties which are moderately successful. Generally, these conventional films reflect (or backscatter) about 15 to 20 percent of the incoming solar radiation, and transmit through the film about 40 to 65 percent of the incoming solar radiation. The remainder of incoming solar radiation is essentially trapped within the film itself. For widespread automotive and commercial use, these conventional polymer dispersed liquid crystal films should have improved solar attenuation properties; in particular the films should reflect more and thereby transmit less of the incoming solar radiation.

Therefore, it is desirable to provide a polymer dispersed liquid crystal film for use in these types of devices which effectively controls the transmission of solar radiation so as to maximize the backscattering and attenuation of the incoming solar radiation, and thereby accordingly minimize the amount of solar radiation (in the form of heat and light) transmitted through the film. It would also be desirable to minimize the cost of such a film so as to be competitive with the cost for producing conventional films. This would probably best be accomplished by limiting or reducing the amount of liquid crystal component within these films, since the liquid crystal component is the most expensive component within these films.

SUMMARY OF THE INVENTION

Accordingly, it is an object of the present invention to provide a film of a polymer dispersed liquid crystal material having improved solar heat load attenuation and light scattering properties, wherein the film can be made largely opaque in one mode of operation and essentially transparent in another mode of operation.

It is a further object of the present invention that such a film of polymer dispersed liquid crystal material provide these improved solar heat load attenuation and light scattering properties while utilizing significantly reduced amounts of the liquid crystal component as compared to conventional polymer dispersed liquid crystal films.

In accordance with a preferred embodiment of this invention, these and other objects and advantages are accomplished as follows.

An optically responsive polymer dispersed liquid crystal film characterized by improved solar heat load attenuation and light scattering properties is provided. The film contains birefringent nematic liquid crystal microdroplets dispersed in a film of an appropriate polymer. It is believed that satisfactory results would also be obtained using birefringent chiral nematic or smectic liquid crystal materials as well. The liquid crystal microdroplets display positive dielectric anisotropy and/or positive diamagnetic anisotropy, thereby being capable of undergoing repeated transitions, either electrically, thermally, or magnetically induced, between opaque and transparent states.

An inventive feature of this material is that the polymer dispersed liquid crystal film contains up to about ten volume percent of an appropriate accelerator component, although it is preferred that the amount of accelerator range between about 0.1 and three volume percent. The accelerator is chosen from the group consisting of amines and aminobenzoates, with the tertiary amines being most preferred. The particular preferred accelerator is a tertiary amine, N-methyldiethanolamine, and is added to the liquid crystal and polymer matrix material in the preferred amount of about two volume percent, prior to the curing step. The accelerator affects the cure kinetics of the liquid crystal-polymer matrix mixture, accelerating the rate of curing of the polymer dispersed liquid crystal film at a given temperature. This results in generally smaller microdroplets of the liquid crystal within the polymer matrix, and also a higher concentration of liquid crystal contained within the microdroplets instead of dissolved within the polymer matrix. Both of these properties enhance the light scattering and solar attenuation properties of the film. The polymer dispersed liquid crystal films are preferably cured by exposing the materials to an appropriate intensity and duration of ultraviolet radiation, although other curing methods may also be used.

The polymer dispersed liquid crystal films formed in accordance with this invention exhibit enhanced solar attenuation properties as compared to conventionally formed polymer dispersed liquid crystal films which do not contain an accelerator component. Our accelerator-containing films transmitted significantly less of the solar radiation through the film by increasing the amount of backscattering or reflection of the solar radiation. In particular, the accelerator-containing films of this invention were characterized by a 23 percent increase in the amount of solar radiation reflected or backscattered from the film, and a 17 percent reduction in the amount of solar radiation transmitted through the film, as compared to conventionally formed films having the same liquid crystal component and polymer matrix.

As noted above, the amount of the preferred accelerator necessary to achieve these significant improvements in solar heat load attenuation and light scattering properties of the polymer dispersed liquid crystal films is extremely small, i.e., approximately 0.1 to three volume percent. Optimum performance is obtained for a preferred accelerator concentration of about two volume percent within the films. It is believed that accelerator additions up to about ten percent could probably be added with no significant degradation to the film; however, no further enhancements of the optical properties would be achieved either.

In addition, another important advantage of the polymer dispersed liquid crystal films formed in accordance with this invention, is that the improved performance of these films was accomplished using a significantly reduced amount of the liquid crystal component. For example, the concentration of liquid crystal in the accelerator-containing films of this invention was approximately 50 percent lower than the conventional films which do not contain an accelerator component. Since the liquid crystal is typically the most expensive component in a polymer dispersed liquid crystal film, use of these accelerator-containing films can potentially lead to significant cost reductions.

Therefore, with this invention, polymer dispersed liquid crystal films having up to about ten volume percent of an accelerator component added thereto, exhibit substantial improvement in performance with reduced liquid crystal concentrations. We are the first to provide such films having these particularly advantageous features.

Other objects and advantages of this invention will be better appreciated from a detailed description thereof, which follows.

BRIEF DESCRIPTION OF THE DRAWINGS

The above and other advantages of this invention will become more apparent from the following description taken in conjunction with the accompanying drawings wherein like references refer to like parts and wherein.

DETAILED DESCRIPTION OF THE INVENTION

Figure 1:
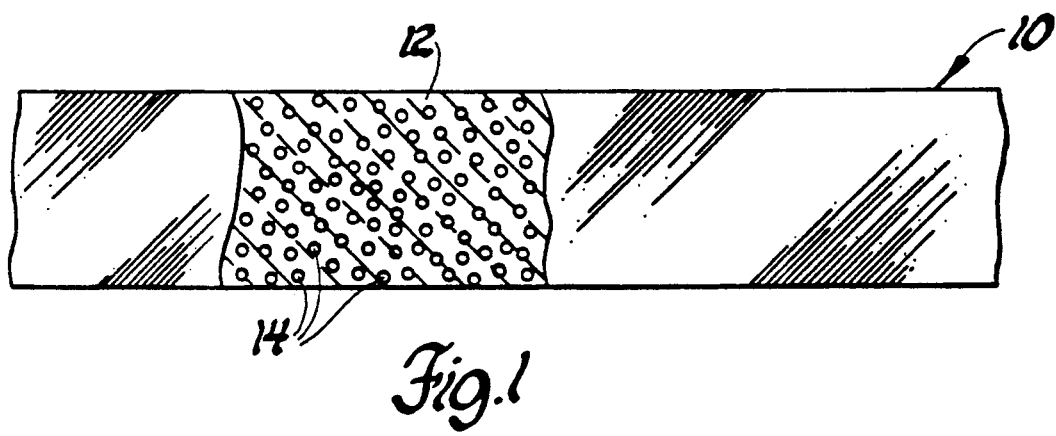
FIG. 1 is a schematic view in cross-section and greatly enlarged of a liquid crystal-containing film of this invention.

An optically responsive film of a polymer dispersed liquid crystal material containing a predetermined amount of an organic photoaccelerator component, and having improved light scattering and solar heat load attenuation characteristics, is provided. The accelerator-containing polymer dispersed liquid crystal film achieves this enhanced optical performance while utilizing a significantly reduced amount of the liquid crystal component as compared to conventional polymer dispersed liquid crystal films.

The film contains birefringent nematic liquid crystal microdroplets dispersed in a film of an appropriate polymer. It is believed that satisfactory results would also be obtained using birefringent chiral nematic or smectic liquid crystal materials also. The polymer dispersed liquid crystal films were made using two different, commercially available liquid crystal mixtures having the following trade names: ROTN404 which is available from F. Hoffman-LaRoche, Nutley N.J., and BL009 which is available from BDH Limited, Poole, England. The chemical composition of the birefringent nematic ROTN404 liquid crystal mixture is approximately:

- 30 weight percent of the known liquid crystal component 5OCB having the chemical name [1,1'Biphenyl]-4-carbonitrile,4'-pentyloxy-;
- 15 weight percent of the known liquid crystal component 8OCB having the chemical name [1,1'Biphenyl]-4-carbonitrile,4'-octyloxy-;
- 10 weight percent of the known liquid crystal component 5CT having the chemical name [1,1', 4', 1"-Terphenyl]-4-carbonitrile,4"pentyl;
- 10 weight percent of the known liquid crystal component RO-CP-7035 having the chemical name Benzonitrile,4-(5-pentyl-2-pyrimidinyl)-;
- 20 weight percent of the known liquid crystal component RO-CP-7037 having the chemical name Benzonitrile,4-(5-heptyl-2-pyrimidinyl)-; and
- 15 weight percent of the known liquid crystal component RO-CM-7334 having the chemical name Benzonitrile,4-[5-(4-butylphenyl)-2-pyrimidinyl].

The chemical composition of the birefringent nematic BL009 liquid crystal mixture is not publicly available, but it is believed to be comprised mostly of cyanobiphenyls and cyanoterphenyls.

It is believed that since the ROTN404 and BL009 liquid crystal mixtures differ so significantly in their chemical composition, that the beneficial effects of the accelerator additive to the films of this invention are indicative of substantive changes in the polymer matrix and film composition and constitution, and thereby not limited by the choice of the liquid crystal employed within the film. Therefore, it is also believed that the advantages of this invention, namely the improved solar attenuation properties of the film and the reduction in the amount of liquid crystal component, would be realized even when other liquid crystal mixtures are utilized, including birefringent chiral nematic and smectic liquid crystal materials.

The liquid crystal microdroplets display positive dielectric anisotropy and/or positive diamagnetic anisotropy, and are thereby capable of undergoing repeated transitions, which are either electrically, thermally, or magnetically induced, between largely opaque and transparent states.

All of the prepared films contained the same basic mixture of commercially available polymer precursors: approximately 37.5 volume percent Photomer 6008 which is available from Diamond Shamrock, Morristown, N.J., approximately 50 volume percent PETMP and approximately 12.5 volume percent PETA, which are both available from Evans Chemetics, W. R. Grace and Co., Darrien, Conn. For convenience, we labelled this basic mixture of the polymer precursors as P6008. Again, the choice of these particular polymer precursors was based on their proven results in our many studies involving these polymer dispersed liquid crystal films. It is believed that other known polymer precursors which are utilized in these types of films, could also be satisfactorily employed with the teachings of this invention.

The chemical compositions of these polymer precursors are as follows. The Photomer 6008 is the trade name for a diurethane diacrylate. The PETMP is the trade name for pentaerythritol tetrakis(3-mercaptopropionate). Finally, the PETA is the trade name for a single component pentaerythritol tetraacrylate. The mixture of these polymer precursors is polymerizable upon exposure to ultraviolet radiation, as well as other forms of radiation, and is a mercaptan-activated diurethane diacrylate system. More generally, this mixture is a member of the mercaptan-activated acrylate systems. It is believed that members of this broader family would respond to the addition of the amounts of the preferred organic accelerators, which are described more fully later, in a similar manner as compared to the mercaptan-activated diurethane diacrylate compound, described in detail in this specification, and are therefore included within the teachings of this invention.

Films were formed in accordance with this invention by adding to this basic polymer precursor mixture, the P6008, an additional mixture consisting of the preferred accelerator component and a photoinitiator to enhance the effects of the ultraviolet irradiation used in the subsequent curing step. This accelerator-containing mixture was characterized by a two to one (2:1) volume ratio of the photoinitiator to the accelerator.

The preferred photoinitiator employed was a commercially available material having the trade name Darocure 11730 from EM Industries, Hawthorne, N.Y. and represented by the chemical formula 2-Hydroxy-2-methyl-1-phenyl-(-phenyl-propan-1)-one. The Darocure 11730 photoinitiator was chosen because of our extensive work with it and our proven results during the development of the ultraviolet curing methods used for forming these types of polymer dispersed liquid crystal films. The ultraviolet curing methods were disclosed in U.S. Pat. No. 4,728,547 issued Mar. 1, 1988 to Vaz et al., which is incorporated herein by reference, and were used to cure all of the samples presented herein. It is believed that other curing methods could be easily employed with equivalent results obtained, such as thermal curing or electron beam curing techniques, although the use of a photoinitiator would not be necessary since it is only required for the ultraviolet radiation cured method. Certainly, other ultraviolet photoinitiators could be used, such as those which are commercially available and derived from acetophenone like the preferred photoinitiator, or alternatively those which are derived from benzoin and the benzil ketal derivatives, among others.

It is to be noted that the use of an accelerator within these polymer dispersed liquid crystal films, increases the rate of thermally-induced cure at room temperature of the polymer matrix. Therefore, the ultraviolet cure must be initiated immediately after preparing the polymer precursor-liquid crystal- accelerator mixture.

Accelerators were investigated as a likely candidate for improving the properties of these films because of their usefulness for accelerating the cure rate of the polymer matrix. Previously, accelerators had only been used in polymer systems for modification of the physical properties of the polymer-based material, not for improving the electro-optic properties of a polymer dispersed liquid crystal film.

The preferred accelerator used was water soluble N-methyldiethanolamine which is commercially available from Aldrich Chemical Corp., Milwaukee, Wis. and characterized by the following structure.

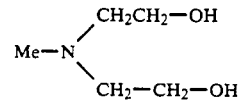

This preferred accelerator is a member of the chemical family of tertiary amines, and was chosen because it best produced the desired optical properties, i.e., the improved light scattering and solar attenuation properties in the final polymer dispersed liquid crystal film, as well as its compatibility with the other components and its relative availability. However other organic photoaccelerators and synergistic agents may also be used with probable success. Preferably the accelerator should be chosen from the group consisting of other amines and aminobenzoates. Within the amines family, there are primary, secondary and tertiary amines, with the tertiary amines being most preferred. Specific examples of other accelerators which could probably be used are 2-dimethylaminoethanol, 2,2',2''-nitrilo-triethanol, ethyl 4-dimethylaminobenzoate, triethanolamine, 2(n-butoxy)ethyl 4-dimethylamino benzoate, 2-ethyl hexyl p-dimethyl-aminobenzoate, amyl p-dimethyl-aminobenzoate and tri-isopropanolamine, as well as others. It is believed that appropriate inorganic photoaccelerators could also be used successfully.

By varying the concentration of the accelerator-containing mixture within the basic polymer precursor mixture, P6008, we studied films in which the accelerator concentration varied from about 0.1 to about 2.9 volume percent. In general we determined that the addition of this accelerator component to the basic polymer precursor mixture prior to the curing step, significantly improved the resulting optical performance of the film as determined by measuring solar heat load attenuation and light scattering properties for each of the films. The best electro-optic properties were obtained with films containing, by volume, about 94.1% of the P6008 basic polymer precursor mixture, about 3.9% of the Darocure 11730 photoinitiator and about 2.0% of the preferred accelerator, N-methyldiethanolamine. This optimum combination of accelerator and polymer precursor components was labelled as P6008A. (It is noted that within the 94.1 volume percent of the P6008 basic polymer precursor mixture, the ratio of liquid crystal to the polymer precursor varied and is listed in the accompanying tables.)

In practice, we have determined that the amount of the preferred accelerator necessary to achieve these significant improvements in solar heat load attenuation and light scattering properties of the polymer dispersed liquid crystal films is actually extremely small, i.e., approximately 0.1 to approximately three volume percent. This small amount results in no measurable degradation to the resulting properties of the film, yet facilitates significant enhancements in the optical properties of the film. As stated above, optimum performance is achieved using a preferred accelerator concentration of about two volume percent of the N-methyldiethanolamine within the films.

We also believe that the accelerator component could be added in an amount up to about ten volume percent within the polymer dispersed liquid crystal film. This amount would greatly accelerate the cure rate of the polymer matrix and accordingly confine a greater amount of the liquid crystal component within the microdroplets instead of remaining dissolved within the polymer matrix. Both of these features appear to be extremely desirable for solar attenuation properties. However, no additional increases in the optical properties of the resulting films were observed at accelerator amounts over about three volume percent up to about ten volume percent. In addition, above this ten percent limit, additional amounts of the accelerator would probably begin to degrade the properties of the polymer dispersed liquid crystal film.

It is believed that the addition of the organic photoaccelerator affects the cure kinetics of the liquid crystal and polymer matrix mixture, thereby resulting in an accelerated rate of curing for the polymer dispersed liquid crystal film. This results in generally smaller microdroplets within the polymer matrix, with the liquid crystal being contained within the microdroplets and a finer dispersion of the microdroplets. In addition, as stated previously, it is believed that the accelerated cure rate traps and contains more of the liquid crystal within the microdroplets, instead of the liquid crystal remaining dissolved within the polymer matrix. This is beneficial since the liquid crystal is only optically useful when entrapped within the microdroplets.

Figure 2:
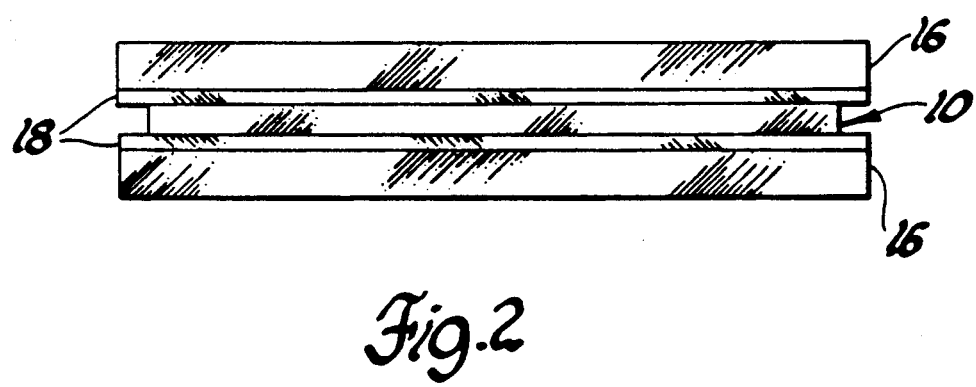
FIG. 2 is a schematic view in enlarged cross-section of the film shown in FIG. 1 disposed between two transparent plates.

In order to determine the light scattering and solar attenuation properties for these polymer dispersed liquid crystal materials, films of the various materials were formed. FIG. 1 shows an illustrative examples of a film 10 of the cured polymer matrix 12 having microdroplets 14 of liquid crystal material therein. FIG. 2 illustrates the film 10 of FIG. 1 sandwiched between two transparent substrates 16, which are most probably glass but other transparent durable materials may also be used. A transparent, electrically conductive coating 18, (preferably an indium-tin oxide-coating, but other electrically conductive materials such as tin oxide, gold or silver may also be used) is provided between the cured film 10 and each transparent substrate 16, so as to physically and electrically contact the cured film 10 and electrically communicate external electrical signals across the thickness of the film 10.

It is noted that all of the films presented herein were made with identical indium-tin oxide-coated glass substrates, therefore the improvements in solar reflectance are due to the increased backscattering by the polymer dispersed liquid crystal film.

The films of the various polymer dispersed liquid crystal films presented herein were tested using the following procedure to determine their solar radiation attenuation properties. The off-state hemispherical transmittance and reflectance of each sample were measured as a function of wavelength by using a Perkin-Elmer lambda-9 spectrophotometer equipped with an integrating sphere. The spectral transmittance and reflectance were multiplied by the air-mass-2 solar irradiance at each wavelength and integrated to determine the fraction of the incoming solar radiation transmitted or reflected by the sample.

As shown in Table 1, comparative results between conventionally formed polymer dispersed liquid crystal films and the accelerator-containing films of this invention are listed. The conventionally formed films contained about 97.6 volume percent of the basic polymer precursor mixture P6008 and about 2.4 volume percent of the photoinitiator Darocure 11730. Again, it is recalled that within the basic polymer precursor mixture P6008, the liquid crystal-to-polymer ratio varied as shown in the accompanying tables. This combination of polymer precursor materials which did not contain an accelerator component was designated as P6008B, while the combination of polymer precursor materials having the accelerator component were designated as P6008A. All of the samples of Table 1 employed the liquid crystal ROTN404. In addition, all of the samples were cured using the ultraviolet radiation techniques taught and disclosed in the above-mentioned U.S. Pat. No. 4,728,547 issued Mar. 1, 1988 to Vaz et al. Three sets of samples were studied to determine the effects of the accelerator additions and ultraviolet radiation intensity, on the light scattering solar attenuation properties of these films.

TABLE 1

Comparison of ROTN404-based Polymer Dispersed Liquid Crystal film samples with and without two volume percent accelerator additions.

| Sample # | Polymer | LC:Polymer Ratio | Accelerator | % Solar Transmittance | % Solar Reflectance |
|---|---|---|---|---|---|
| 1 | P6008A | 0.7:1 | Yes | 46.5 | 18.0 |
| 2 | P6008A | 0.6:1 | Yes | 35.4 | 27.1 |
| 3 | P6008A | 0.47:1 | Yes | 39.2 | 22.6 |
| 4 | P6008B | 1.1:1 | No | 59.7 | 17.0 |
| 5 | P6008B | 1.22:1 | No | 48.1 | 18.8 |
| 6 | P6008B | 1.46:1 | No | 64.4 | 16.0 |
| 7 | P6008B | 1.70:1 | No | 63.3 | 16.4 |
| 8 | P6008B | 2:1 | No | 66.0 | 16.4 |
| 9 | P6008B | 1.1:1 | No | 49.5 | 17.0 |
| 10 | P6008B | 1.1:1 | No | 52.8 | 16.9 |
| 11 | P6008B | 1.2:1 | No | 42.6 | 22.1 |
| 12 | P6008B | 1.2:1 | No | 44.8 | 20.3 |
| 13 | P6008B | 1.46:1 | No | 48.0 | 18.7 |
| 14 | P6008B | 1.46:1 | No | 43.4 | 19.9 |
| 15 | P6008B | 1.72:1 | No | 62.3 | 14.8 |
| 16 | P6008B | 1.72:1 | No | 57.0 | 15.5 |

As stated above, the polymer dispersed liquid crystal film samples of Table 1, utilized the liquid crystal ROTN404 and polymer precursor mixture P6008A (accelerator-containing) or P6008B, as indicated. Within each of the three sets of samples which were studied to determine the effects of (1) the accelerator additions and (2) the variation of ultraviolet radiation intensity during curing on the solar radiation attenuation properties of the various resulting films, that film which exhibited the best light scattering and solar attenuation properties is highlighted in bold print.

In the first series of samples (1 through 3) the matrix contained two volume percent of the preferred organic photoaccelerator, N-methyldiethanolamine. These samples were cured by exposure to ultraviolet radiation (UV) from a Fusion Systems Model 460 UV curing system which utilizes a 10" high-intensity lamp emitting 375 Watts/inch. These samples were passed under the lamp at a speed of about 8.6 feet/minute and at a cure temperature of about 45° C. Sample number 2 had the best performance in this group: 35.4% solar transmittance and 27.1% solar reflectance, with a liquid crystal-to-polymer volume ratio of about 0.6:1 within the basic polymer precursor mixture P6008A.

These solar attenuation properties are a substantial improvement over the conventionally formed films which do not contain an accelerator addition, as more fully described below. It is believed that the solar radiation which is not reflected or transmitted through the film, is essentially trapped within the interior of the film. When the polymer dispersed liquid crystal film is large enough, such as in an automotive window or sunroof panel, the trapped solar radiation essentially dissipates within the interior of the film and does not add to the amount of transmitted solar radiation.

Samples in the second series (4 through 8) did not contain accelerator and differed from each other only in the liquid crystal to volume ratio. These samples were cured by exposure to ultraviolet radiation from a Fusion Systems Model Super Six UV curing system (Fusion Systems, Inc., Rockville, Md.) which utilizes a 6 inch lamp emitting 200 Watts/inch. The samples were positioned so as to be stationary under the lamp and were cured at a temperature of about 63° C. From Table 1, sample number 5, which had a liquid crystal to polymer volume ratio of 1.22:1 within the basic polymer precursor mixture P6008B, had the best solar attenuation properties in this group: 48.1% solar transmittance and 18.8% solar reflectance.

The third series of samples, (9 through 16) also did not contain an accelerator and again varied only in the liquid crystal to polymer volume ratio. However these samples were cured by exposure to the same, high intensity conditions used to cure the first group of samples having the accelerator additions (Fusion 460 System, 10 inch high intensity lamp). Sample 11, which has a liquid crystal to polymer volume ratio of 1.2:1 within the basic polymer precursor mixture P6008B, had the best solar attenuation properties in this group of sample films: 42.6% solar transmittance and 22.1% solar reflectance. These values represent a decrease in the solar transmittance of about 11% and an increase in solar reflectance of about 18%, as compared with the best results achieved in the second set of sample films, which also did not contain the accelerator additions but which were ultraviolet cured at a lower intensity. Therefore, by increasing the intensity of the ultraviolet radiation during the curing step, improvements in the light scattering and solar attenuation properties may be achieved, even in films which do not contain an accelerator component.

Clearly though, the best light scattering and solar attenuation properties were obtained with the sample films of group 1, as indicated in Table 1. Comparing the properties of these accelerator-containing films with those which did not contain the accelerator component, the accelerator-containing polymer dispersed liquid crystal films formed in accordance with this invention exhibit enhanced light scattering and solar attenuation properties as compared to the conventionally formed polymer dispersed liquid crystal materials which do not have an accelerator component. These accelerator-containing films transmitted significantly less of the solar radiation through the film (as indicated by the substantial decrease in percent solar transmittance) by increasing the amount of backscattering or reflection of the solar radiation (as indicated by the substantial increase in percent solar In particular, as compared to conventionally prepared films having the same polymer matrix and liquid crystal component but no accelerator additions, the films of this invention having the accelerator component were characterized by an average reduction of approximately 17 percent in the amount of solar radiation transmitted and an average increase of approximately 23 percent in the amount of solar radiation reflected.

In addition, another significantly advantageous feature of the accelerator-containing polymer dispersed liquid crystal films formed in accordance with this invention, is that the improved performance of the film is accomplished using a substantially reduced amount of liquid crystal concentration. For example, the concentration of liquid crystal in sample film number two, which contains the preferred accelerator, is approximately 50 percent lower than the concentration of liquid crystal in sample number 11, which has the best performance of films without accelerator. Yet, film sample number two which has the accelerator component in accordance with this invention has significantly better solar attenuation properties, as indicated in Table 1.

It is believed that by adding the accelerator component to the liquid crystal-polymer precursor mixture in accordance with this invention, the liquid crystal-to-polymer volume ratio need not increase over about 0.75:1, or at the most about 1:1, for satisfactory (and actually enhanced) properties to be obtained as compared to the conventional films. Our accelerator-containing films utilized a liquid crystal-to-polymer ratio ranging from about 0.47:1 to about 0.7:1. As noted from the accompanying tables, the liquid crystal-to-polymer ratios for the conventional films are at the minimum about 1:1, with significantly poorer solar attenuation properties as compared to the accelerator-containing films. Certainly, the liquid crystal-to-polymer ratio could be increased to about 1:1 or greater for the accelerator-containing films; however it is not clear that greater enhancements in the optical properties would be obtained and in fact degradation of the electro-optic properties of the film may result, as well as the loss of any cost reduction benefits associated with the decreased amount of liquid crystal.

In all samples where the accelerator component has been added, we have observed substantial improvement in performance with reduced liquid crystal concentrations. This is a particularly advantageous feature of this invention, since the liquid crystal is usually the most expensive component in a polymer dispersed liquid crystal film; therefore, use of these accelerator-containing films can potentially lead to significant cost reductions.

In another example, Table 2 summarizes the characteristics and performance of various polymer dispersed liquid crystal films that were made with the same polymer precursor mixtures identified in Table 1, but having a different liquid crystal mixture, the BL009 liquid crystal mixture which was previously identified.

TABLE 2

Comparison of BL009-based Polymer Dispersed Liquid Crystal film samples with and without two volume percent accelerator additions.

| Sample # | Polymer | LC:Polymer Ratio | Accelerator | % Solar Transmittance | % Solar Reflectance |
|---|---|---|---|---|---|
| 17 | P6008A | 0.59:1 | Yes | 36.2 | 26.6 |
| 18 | P6008A | 0.59:1 | Yes | 37.5 | 24.6 |
| 19 | P6008B | 1:1 | No | 58.0 | 15.4 |
| 20 | P6008B | 1.5:1 | No | 54.8 | 20.4 |
| 21 | P6008B | 2:1 | No | 52.8 | 19.6 |

Within each of the two sets of samples shown in Table 2, that film which exhibited the best light scattering and solar attenuation properties is highlighted in bold print. The matrix of samples 17 and 18 contained two volume percent of the preferred photoaccelerator, while samples 19 through 21 were conventionally formed without the accelerator additions. All of the five samples identified in Table 2 were cured under the same conditions which gave the best results for the ROTN-404 liquid crystal-based films in Table 1, i.e., those cure conditions used to cure the accelerator-containing films (samples 1 through 3) and the third set of conventional films (samples 9 through 16) by exposure to ultraviolet radiation from the high intensity Fusion 460 system at a temperature of about 45° C. It is to be noted that the BL009-based polymer dispersed liquid crystal films must be cured at a temperature greater than the critical temperature of 43° C. so as to ensure that the various components are completely dissolved.

It is clear from the data listed in Table 2, that the accelerator-containing films (samples 17 and 18) transmitted substantially less of the solar radiation through the film by substantially increasing the amount of solar radiation reflected by the film, as compared to the conventional films (samples 19 through 20). An extremely advantageous feature of this invention is that the improved performance of the accelerator-containing films, samples 17 and 18, was obtained using approximately 50% less liquid crystal than the three film samples without the accelerator additions.

Additional samples were prepared using the high intensity curing methods described above, which contained various other photoaccelerators; particularly two tertiary amines, 2-dimethylaminoethanol and 2,2',2"-nitrilo-triethanol, and an aminobenzoate, ethyl-4-dimethylaminobenzoate.

A sample was prepared using the BL009 liquid crystal mixture, the basic polymer precursor matrix, P6008, the Darocure 11730 photoinitiator for ultraviolet curing, and about two volume percent of 2-dimethylaminoethanol, which is a tertiary amine having the chemical formula, $HOCH_2CH_2N(CH_3)_2$, and available from Aldrich Chemical Co., Milwaukee, Wis. The liquid crystal-to-polymer ratio was about 0.6:1. A second sample was prepared identically but without the accelerator and had a liquid crystal-to-polymer ratio of about 2:1. The light scattering and solar attenuation properties of the accelerator-containing film were visually better than the film which did not contain the accelerator additions. Also, the amount of liquid crystal necessary to obtain these improvements in the electro-optic properties was significantly reduced.

Samples were also prepared to test the electro-optic properties of films having the photoaccelerator, 2,2',2"-nitrilo-triethanol, which is a tertiary amine having the chemical formula $(HOCH_2CH_2)_3N$, and available from Aldrich Chemical Co., Milwaukee, Wis. A sample was prepared using the BL009 liquid crystal mixture, the basic polymer precursor matrix, P6008, the Darocure 11730 photoinitiator for ultraviolet curing, and about two volume percent of the 2,2',2"-nitrilo-triethanol. The liquid crystal-to-polymer ratio was about 0.6:1. A second sample was prepared identically but without the accelerator and had a liquid crystal-to-polymer ratio of about 2:1. Again, the light scattering and solar attenuation properties of the accelerator-containing film were visually better than the film which did not contain the accelerator additions. Further, the amount of liquid crystal necessary to obtain these improvements in the electro-optic properties was significantly reduced.

Both of these tertiary amine photoaccelerators resulted in films having a significantly reduced amount of the liquid crystal component and good electro-optic and solar attenuation properties, as compared to the films which did not contain the accelerator. However, from a visual inspection, the electro-optic properties of the films having a comparable amount of the preferred accelerator, N-methyldiethanolamine, as summarized in the above Tables, were better than the films having these alternative tertiary amine accelerators.

A last set of samples were prepared to determine the electro-optic effects of using the aminobenzoate photoaccelerator, ethyl-4-dimethylaminobenzoate, available from Aceto Chemical Co., Flushing, N.Y. A sample was prepared using the BL009 liquid crystal mixture and the commercially available polymer precursor mixture NOA65, and having about two volume percent of the ethyl-4-dimethylaminobenzoate. NOA65 which is available from Norland Products, New Brunswick, N.J. contains approximately 56 weight percent triallyl isocyanurate, approximately 41 weight percent pentaerythritol, tetrakis(2-mercaptopropanoate) and approximately 4 weight percent benzophenone. This mixture is a member of the broad family of mercaptan-activated acrylate compounds. In particular it is a mercaptan-activated allyl compound. A second sample was prepared identically but without the accelerator. Both samples had a liquid crystal-to-polymer ratio of about 2:1. Again, the light scattering and solar attenuation properties of the accelerator-containing film were visually better than the film which did not contain the accelerator additions. However, with this photoaccelerator, the amount of liquid crystal necessary to obtain these improvements in the electro-optic properties was not reduced, possibly because the aminobenzoates may be less efficient at affecting the cure kinetics or possibly because of the different polymer precursor employed.

We have determined that the addition of a photoaccelerator within the liquid crystal - polymer precursor mixture prior to the curing of this mixture, results in a polymer dispersed liquid crystal film having improved capabilities for rejection of solar radiation. The accelerator-containing films of this invention transmit significantly less solar radiation by substantially increasing the reflected amount of radiation. These accelerator-containing films of this invention are particularly suitable for use in applications where reduced solar heat and light loads are desired, such as light shutters, sunroofs as well as many other devices.

In addition, the amount of accelerator necessary for obtaining these significant improvements in the solar attenuation characteristics of the polymer dispersed liquid crystal films is small, preferably about 0.1 to three percent by volume. As stated previously, optimum performance is obtained with an accelerator concentration of about two volume percent under the conditions presented above. We believe that the benefits derived from the addition of the accelerator are due in part to changes in the kinetics of the polymerization reaction during the curing step, since various changes in the film composition did not produce results as good as those obtained by the addition of about two volume percent accelerator.

Further, it is to be noted that the amount of liquid crystal required to construct these accelerator-containing polymer dispersed liquid crystal films can be reduced by as much as 50%, as compared to conventional films, while improving the film performance. Since the liquid crystal is typically the most expensive component of the polymer dispersed liquid crystal films, it is extremely beneficial to reduce the amount of liquid crystal used.

Another advantage of these accelerator-containing polymer dispersed liquid crystal films is that they may result in increased efficiency of the manufacturing operations used to form these films. With the accelerator additions, the cure rates are accordingly accelerated and the duration of the curing step is substantially reduced, by up to about a factor of three as compared to conventional films. It may also be appropriate in some instances to increase only the intensity of the ultraviolet radiation so as to effect an increase in the cure rate, without adding the accelerator component. However, we have determined that the best results are obtained when the accelerator is used and combined with the high intensity ultraviolet radiation during cure.

While our invention has been described in terms of specific examples, it will be appreciated that other embodiments could readily be adapted by one skilled in the art. Examples of such would be to use other curing techniques such as thermal or electron-beam techniques, or to modify the ultraviolet curing methods discussed or to vary the materials used including the liquid crystal, polymer precursors or photoaccelerator. Accordingly, the scope of our invention is to be considered limited only by the following claims.

The embodiments of the invention in which an exclusive property or privilege is claimed are defined as follows:

1. An optically responsive film comprising:
    liquid crystal microdroplets dispersed in a film of an ultraviolet-cured reaction product, said microdroplets displaying positive dielectric anisotropy and/or positive diamagnetic anisotropy; and
    said ultraviolet-cured reaction product comprising a mercaptan-activated acrylate compound, and between about 0.1 and three volume percent of an organic photoaccelerator chosen from the group consisting of the amines and the aminobenzoates and being effective to significantly accelerate the rate of the ultraviolet cure employed to produce said cured reaction product, thereby resulting in a dispersion of fine microdroplets within said cured reaction product;
    said film being capable of undergoing repeated electrically and magnetically induced transitions between opaque and transparent.

2. An optically responsive film as recited in claim 1 wherein said organic photoaccelerator is a tertiary amine.

3. An optically responsive film as recited in claim 1 wherein said ultraviolet-cured reaction product comprises a mercaptan-activated diurethane diacrylate compound and said organic photoaccelerator is N-methyldiethanolamine.

4. An optically responsive film as recited in claim 1 wherein said ultraviolet-cured reaction product comprises a mercaptan-activated allyl compound and said organic photoaccelerator is N-methyldiethanolamine.

5. An optically responsive film as recited in claim 1 wherein the volume amount of said liquid crystal as compared to the volume amount of the polymer components within said ultraviolet-cured reaction product does not exceed a ratio of about 1:1.

6. An optically responsive film suitable for use in a device for attenuation of solar radiation comprising:
    birefringent nematic liquid crystal microdroplets dispersed in a film of an ultraviolet radiation-cured reaction product, said microdroplets displaying positive dielectric anisotropy and/or positive diamagnetic anisotropy; and
    said ultraviolet-cured reaction product comprising a mercaptan-activated diurethane diacrylate compound, and between about 0.1 to about three volume percent of an organic photoaccelerator, said organic photoaccelerator chosen from the group consisting of the amines and the aminobenzoates and being effective to significantly accelerate the rate of the ultraviolet cure employed to produce said cured reaction product, thereby resulting in a dispersion of fine microdroplets within said cured reaction product;
    said film being capable of undergoing repeated electrically and magnetically induced transitions between opaque and transparent.

7. An optically responsive film as recited in claim 6 wherein said organic photoaccelerator is a tertiary amine.

8. An optically responsive film as recited in claim 6 wherein said organic photoaccelerator is N-methyldiethanolamine.

9. An optically responsive film as recited in claim 6 wherein the volume amount of said liquid crystal as compared to the volume amount of the polymer components within said ultraviolet-cured reaction product does not exceed a ratio of about 1:1.

10. An optically responsive film suitable for use in a device for attenuation of solar radiation having birefringent nematic liquid crystal microdroplets dispersed in a film of an ultraviolet-cured reaction product, said microdroplets displaying positive dielectric anisotropy and/or positive diamagnetic anisotropy so as to be capable of undergoing repeated electrically and magnetically induced transitions between opaque and transparent, wherein the improvement comprises:
    the ultraviolet-cured reaction product of a mercaptan-activated acrylate compound containing an addition of between about 0.1 to about three volume percent of an organic photoaccelerator, said organic photoaccelerator chosen from the group consisting of the amines or the aminobenzoates and being effective to significantly accelerate the rate of the ultraviolet cure employed to produce said cured reaction product, thereby resulting in a dispersion of fine microdroplets within said cured reaction product.

11. An optically responsive film as recited in claim 10 wherein said organic photoaccelerator is a tertiary amine.

12. An optically responsive film as recited in claim 10 wherein said ultraviolet-cured reaction product comprises a mercaptan-activated diurethane diacrylate compound and said organic photoaccelerator is N-methyldiethanolamine in an amount of approximately two volume percent.

13. An optically responsive film as recited in claim 10 wherein said ultraviolet-cured reaction product comprises a mercaptan-activated allyl compound and said organic photoaccelerator is N-methyldiethanolamine.

14. An optically responsive film as recited in claim 10 wherein the volume amount of said liquid crystal as compared to the volume amount of the polymer components within said ultraviolet-cured reaction product does not exceed a ratio of about 1:1.

15. A method for making an optically responsive film containing microdroplets of a birefringent nematic liquid crystal material dispersed within a polymer matrix, which is suitable for use in a device for attenuating solar radiation comprising the following steps:

mixing the liquid crystal material with an ultraviolet radiation-curable polymer precursor having a mercaptan-activated acrylate compound and an organic photoinitiator;

adding to said mixture between about 0.1 and three volume percent of an organic photoaccelerator chosen from the group consisting of the amines and the aminobenzoates; and effectively curing said mixture in the form of a film with ultraviolet radiation to thereby form a cured polymer matrix which is a reaction product of said precursors, the rate of curing being accelerated sufficiently to result in a fine dispersion of droplets of liquid crystal material within said cured polymer matrix and wherein said droplets of liquid crystal material display positive dielectric anisotropy and/or positive diamagnetic anisotropy.

16. A method for making an optically responsive film as recited in claim 15 wherein the ratio of said liquid crystal to said polymer precursor does not exceed about 1:1.

17. A method for making an optically responsive film as recited in claim 15 wherein said organic photoaccelerator is a tertiary amine.

18. A method for making an optically responsive film as recited in claim 15 wherein said mercaptan-activated acrylate compound is diurethane diacrylate and said organic photoaccelerator is N-methyldiethanolamine.

19. A method for making an optically responsive film as recited in claim 15 wherein said mercaptan-activated acrylate compound is triallyl isocyanurate and said organic photoaccelerator is N-methyldiethanolamine.

* * * * *